United States Patent
Avalos et al.

(10) Patent No.: US 11,628,966 B2
(45) Date of Patent: Apr. 18, 2023

(54) FREEZABLE AND REUSABLE BOTTLE AND METHOD OF MAKING THE BOTTLE

(71) Applicant: Dart Industries Inc., Orlando, FL (US)

(72) Inventors: Norma Angelica Avalos, Windermere, FL (US); Keith Haggerty, Hemingway, SC (US)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 17/227,498

(22) Filed: Apr. 12, 2021

(65) Prior Publication Data

US 2022/0324602 A1 Oct. 13, 2022

(51) Int. Cl.
*B65D 1/02* (2006.01)
*B65D 1/44* (2006.01)
*B65D 25/56* (2006.01)

(52) U.S. Cl.
CPC ............. *B65D 1/0207* (2013.01); *B65D 1/44* (2013.01); *B65D 25/56* (2013.01); *B65D 2203/04* (2013.01); *B65D 2501/0027* (2013.01)

(58) Field of Classification Search
CPC .......... B65D 1/00; B65D 1/0207; B65D 1/44; B65D 25/56; B65D 2203/04; B65D 2501/0027
USPC .................. 215/305, 381; D9/443, 436, 445; 206/373
See application file for complete search history.

(56) References Cited

U.S. PATENT DOCUMENTS

| | | | |
|---|---|---|---|
| 4,568,723 A * | 2/1986 | Lu | C08L 23/12 525/146 |
| D356,160 S | 3/1995 | Cautereels | |
| 5,910,138 A * | 6/1999 | Sperko | C08L 53/025 604/416 |
| 5,928,213 A * | 7/1999 | Barney | B32B 27/08 604/416 |
| 5,992,628 A * | 11/1999 | Vermilion | B65D 1/22 206/524.1 |
| 6,006,913 A * | 12/1999 | Ludemann | C09J 123/142 428/323 |
| D465,385 S | 11/2002 | Miller | |
| D609,104 S | 2/2010 | Able | |
| 9,518,177 B2 * | 12/2016 | Kim | C08L 53/02 |
| D837,059 S | 1/2019 | Wiggins | |
| 2006/0182912 A1 * | 8/2006 | Sato | B29C 65/76 156/308.4 |
| 2007/0007234 A1 * | 1/2007 | Tanaka | B65D 23/0878 215/381 |
| 2007/0029400 A1 * | 2/2007 | Magargee | A61L 9/12 239/54 |

(Continued)

*Primary Examiner* — King M Chu
*Assistant Examiner* — Prince Pal
(74) *Attorney, Agent, or Firm* — Taylor J. Ross

(57) ABSTRACT

A freezable reusable bottle having a body and a cap engaged with the body. The body includes a container portion and a neck portion extending from the container portion. The container portion includes a plurality of ribs extending along a longitudinal axis of the reusable bottle. The cap removably engages with the neck portion of the body. The body includes a polymer composition of about 85 to 90 percent of polypropylene (PP) and about 10 to 15 percent of an SEBS additive. The bottle may be frozen when filled with a liquid, with the ribs accommodating expansion of the contents during freezing, and the additive providing impact resistance accommodating the rigid frozen contents.

14 Claims, 4 Drawing Sheets

(56) References Cited

U.S. PATENT DOCUMENTS

| | | | |
|---|---|---|---|
| 2007/0071939 A1* | 3/2007 | Hueto | B65D 39/0058 |
| | | | 428/71 |
| 2008/0033124 A1* | 2/2008 | Jiang | C08F 210/06 |
| | | | 526/170 |
| 2008/0257856 A1* | 10/2008 | Melrose | B65D 79/0084 |
| | | | 215/381 |
| 2008/0262140 A1* | 10/2008 | Xavier | C08L 53/00 |
| | | | 524/505 |
| 2010/0247824 A1* | 9/2010 | Chang | B32B 27/28 |
| | | | 428/476.9 |
| 2012/0222976 A1* | 9/2012 | Cave | B65D 1/18 |
| | | | 206/219 |
| 2015/0314979 A1* | 11/2015 | Whalen | B65H 35/04 |
| | | | 242/562 |
| 2020/0010241 A1* | 1/2020 | Siegl | B65D 23/001 |
| 2020/0095010 A1* | 3/2020 | Kira | B65D 1/0223 |
| 2020/0148879 A1* | 5/2020 | Akkapeddi | C08L 67/02 |
| 2020/0307888 A1* | 10/2020 | Dygert | B65D 1/0207 |

* cited by examiner

FREEZABLE AND REUSABLE BOTTLE AND METHOD OF MAKING THE BOTTLE

CROSS-REFERENCE TO RELATED APPLICATIONS

This application is related to co-pending Ser. No. 29/778,179, which is incorporated herein by reference.

TECHNICAL FIELD

The present disclosure relates, in general, to a bottle and more specifically to a freezable and reusable bottle and a method of making the same.

BACKGROUND

Typically, plastic water bottles are used for storing water, beverages, and other liquids. The bottles are formed from materials having various polymer compositions, such as those containing polypropylene and elastomers. Further, the bottles are made suitable for the normal use of storing the liquids or consuming the stored liquids. Depending on the polymeric materials used, the bottles can be disposable, i.e., suitable for one-time use, or reusable, i.e., suitable for repeated use over a longer period. The bottles filled with the liquid may be placed in cold storage places to cool the liquid contents. Subjecting the bottles to freezing temperatures typically results in undesirable consequences. For example, the expansion of the liquid contents during freezing may cause the body of the bottle to develop cracks which can cause leakage within the cooling chamber, and/or later during thawing. Even if no cracking is caused by expansion, the rigid nature of the frozen contents combined with poor low temperature impact properties of the body may result in the bottle being prone to damage at the slightest impact. The body of the bottle may become brittle when frozen and may not have the resistance to prevent from being damaged due to impact load. However, users strongly desire to freeze bottle contents to enjoy very cold beverages over longer time periods. Bottles that can be reusable over a longer period and that are resistant to damage due to freezing temperatures or impact while frozen are highly desirable for users. Hence, there is a need to develop bottles having improved impact resistance property and the ability to withstand freezing temperatures without damage.

SUMMARY

According to one aspect of the present disclosure, a reusable bottle is disclosed. The reusable bottle includes a body having a container portion and a neck portion extending from the container portion. The container portion includes a plurality of ribs extending along a longitudinal axis of the reusable bottle. The reusable bottle includes a cap configured to engage with the neck portion of the body. The body includes a polymer composition of about 85 to 90 percent of polypropylene (PP) and about 10 to 15 percent of an additive. In a preferred embodiment, the polypropylene is polypropylene random copolymer (PPRC), and the polymer composition includes 85 percent of the polypropylene random copolymer (PPRC). In a most preferred embodiment, the additive is a thermoplastic elastomer (TPE). In another embodiment, the additive is a styrene-based additive. In yet another embodiment, the additive is styrene-ethylene-butylene-styrene (SEBS), and the polymer composition includes 15 percent of the styrene-ethylene-butylene-styrene (SEBS).

In an embodiment, the cap includes a polymer composition of about 85 to 90 percent of polypropylene (PP) and about 10 to 15 percent of an additive, and the polypropylene is polypropylene block copolymer (PPB), and the additive is styrene-ethylene-butylene-styrene (SEBS).

In an embodiment, the reusable bottle includes a fill level indicator defined in the container portion proximate to the neck portion of the body. In another embodiment, a cross-sectional shape of a base portion of the container portion is a rounded square. In yet another embodiment, the plurality of ribs is equally spaced around a circumferential surface of the container portion of the body.

According to another aspect of the present disclosure, a reusable bottle is disclosed. The reusable bottle includes a body having a container portion and a neck portion extending from the container portion. The container portion includes a plurality of ribs extending along a longitudinal axis of the reusable bottle. The reusable bottle includes a cap configured to engage with the neck portion of the body. The body includes a polymer composition of about 85 to 90 percent of polypropylene random copolymer (PPRC) and about 10 to 15 percent of styrene-ethylene-butylene-styrene (SEBS). The cap includes a polymer composition of about 85 to 90 percent of polypropylene block copolymer (PPB) and about 10 to 15 percent of styrene-ethylene-butylene-styrene (SEBS).

According to yet another aspect of the present disclosure, a method of making a reusable bottle is disclosed. The method includes preparing a molten mixture, and the molten mixture is a polymer composition of about 85 to 90 percent of polypropylene (PP) and about 10 to 15 percent of an additive. In an embodiment, the polypropylene is polypropylene random copolymer (PPRC), and the additive is styrene-ethylene-butylene-styrene (SEBS). The method further includes forming a preform of the reusable bottle with the molten mixture. The preform includes a neck portion and a tubular portion extending from the neck portion. The method further includes blowing the tubular portion to form a container portion having a plurality of ribs.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
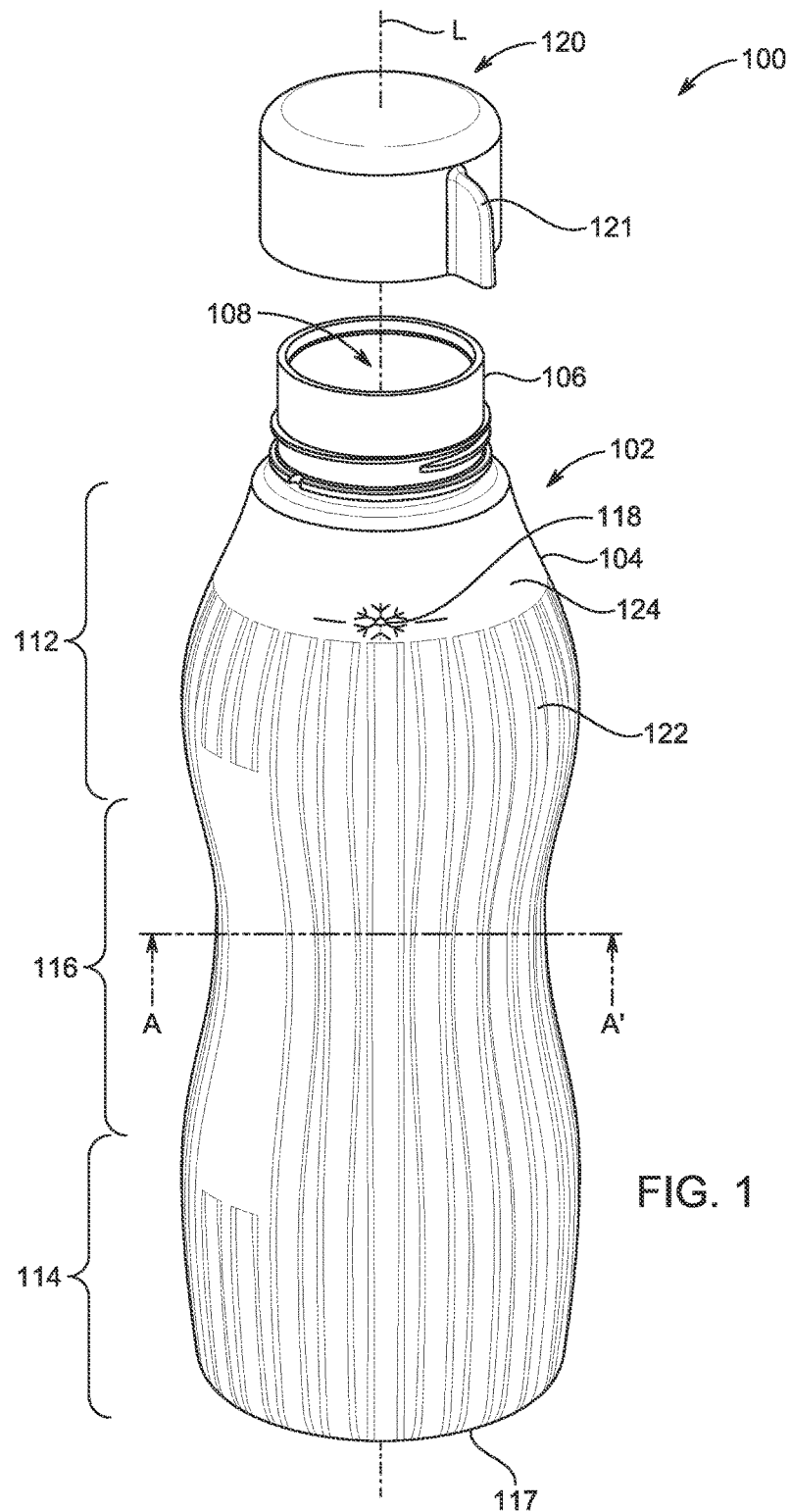
FIG. 1 is an exploded perspective view of a reusable bottle, according to an embodiment of the present disclosure.

Referring to FIG. 1, an exploded perspective view of a reusable bottle 100 is illustrated, according to an embodiment of the present disclosure. The reusable bottle 100 is specifically designed to contain water, beverages or any other liquids that can be frozen. The reusable bottle 100 may be further designed to place in cold storage places such as refrigerator and freezer such that the liquid within the reusable bottle 100 may be kept frozen for a longer period without causing any damage to the reusable bottle 100. The reusable bottle 100 of the present disclosure is made of a material having a polymer composition of polypropylene and additives, such as elastomers, to improve impact resistance of the reusable bottle 100, especially when the contents are frozen. The additives may further improve transparency of the reusable bottle 100.

The reusable bottle 100 includes a body 102 having a container portion 104 and a neck portion 106 extending from the container portion 104. The container portion 104 is configured to contain liquids such as water, beverages or any other liquids that can be frozen. The container portion 104 may define an interior volume 108 to accommodate the liquid. In an example, the interior volume of the reusable bottle 100 may be 750 ml. However, it may be understood by a person of ordinary skill in the art that the interior volume 108 of the container portion 104 may be defined based on various factors including, but not limited to, application of the reusable bottle 100, and the type of liquids to be stored in the reusable bottle 100.

While many shapes are known for the container portion of beverage bottles, in a preferred embodiment the container portion 104 includes a top portion 112 and a base portion 114 which are converged at a waist portion 116. The waist portion 116 has a cross-sectional area smaller than a cross-sectional area of each of the top portion 112 and the base portion 114. As such, the container portion 104 is designed to achieve a shape of pea nut. Each of the top portion 112 and the waist portion 116 has a circular shape, whereas a cross-sectional shape of the base portion 114 is a rounded square. With the rounded square shape of the base portion 114, when the reusable bottle 100 is placed horizontally on planar surfaces or inclined surfaces, the reusable bottle 100 is prevented from rolling over the surfaces. Further, the reusable bottle 100 may be placed horizontally in the event of space constraint in storage locations such as freezer and refrigerator. The base portion 114 may further include feet 117 to provide stability to the reusable bottle 100 when the reusable bottle 100 is kept in upright position. In an example, when the reusable bottle 100 is empty, the reusable bottle 100 may be stable till a tilt angle of 6 degrees and, when the reusable bottle 100 is filled, the reusable bottle 100 may be stable till a tilt angle of 10 degrees.

The top portion 112 of the container portion 104 includes a fill level indicator 118 defined proximate to the neck portion 106 of the body 102. The fill level indicator 118 may be defined as a mark for maximum fill level of the liquid in the reusable bottle 100 as such the liquid content is prevented from spilling (or otherwise expanding beyond the extent of the neck portion 106) due to expansion during freezing. In an example, the fill level indicator 118 may be defined on the container portion 104 in the shape of a snowflake. The fill level indicator 118 may be defined based on various factors including, but not limited to, the interior volume 108 of the reusable bottle 100, the type of liquid that can be stored in the reusable bottle 100, material of the reusable bottle 100, shrinkage properties of the liquid, and shape of the top portion 112 of the container portion 104. In one embodiment, the fill level indicator 118 may be debossed during the manufacturing of the reusable bottle 100. In another embodiment, the fill level indicator 118 may be embossed on the reusable bottle 100. In yet another embodiment, the fill level indicator 118 may be a color marker, label, or a text printed on the container portion 104 to act as a visual indicator to a user.

The reusable bottle 100 further includes a cap 120 configured to engage with the neck portion 106 of the body 102. The neck portion 106 of the body 102 is in a cylindrical shape and extends from the top portion 112 of the container portion 104. In a preferred embodiment, the neck portion 106 may include threads configured to threadably engage with the cap 120. In some embodiments, the cap 120 may be fluid tightly engaged with the neck portion 106 of the body 102 using a press fit, a snap fit or any other engaging technique known to a person of ordinary skill in the art. In one example, the cap 120 may be a screw-top type. In another example (not shown), the cap 120 may be a flip-top type. The cap 120 may further include a tab 121 that may act as a grip for the user to freely engage or disengage the cap 120 with the body 102 of the reusable bottle 100.

Figure 2:
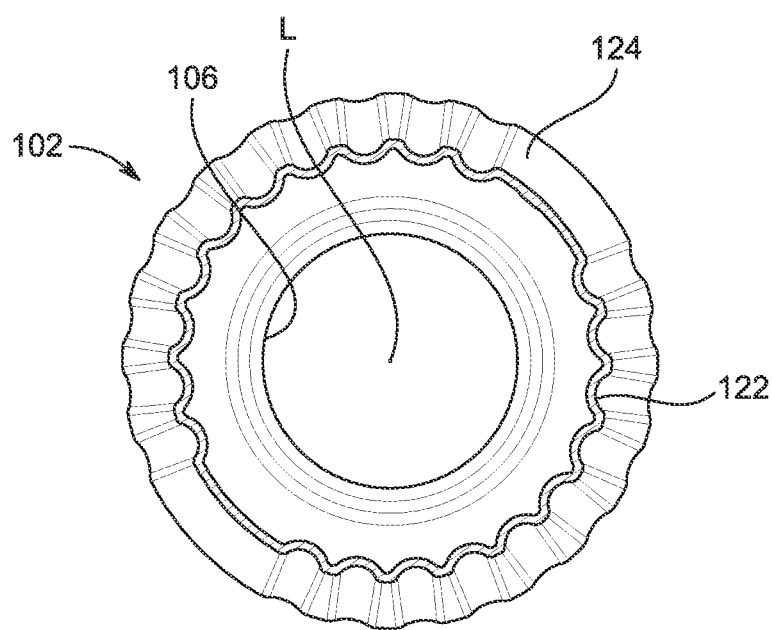
FIG. 2 is a cross-sectional view of the reusable bottle taken along line A-A of FIG. 1.

Referring to FIG. 2, a cross-sectional view of the reusable bottle 100 taken along line A-A of FIG. 1 is illustrated, according to an embodiment of the present disclosure. Referring to FIG. 1 and FIG. 2, the container portion 104 includes a plurality of ribs 122 extending along a longitudinal axis 'L' of the reusable bottle 100. The plurality of ribs 122 is equally spaced around a circumferential surface 124 of the container portion 104. Particularly, each of the plurality of ribs 122 extends from the base portion 114 through the waist portion 116 until the top portion 112 of the container portion 104 along the circumferential surface 124 thereof. As shown in FIG. 2, the plurality of ribs 122 may be defined in the form of a wave shape having troughs and crests. In an embodiment, a linear distance between the crests may be larger in the waist portion 116 compared to a linear distance between crests at the top portion 112 and the base portion 114 of the container portion 104, thereby defining a first width of the crest at the waist portion that is smaller than a second width at the top portion and a third width at the base portion. The linear distance between the crests and the troughs may progressively decrease towards the top portion 112 and the base portion 114 from the waist portion 116. The plurality of ribs 122 having corrugated or wave shaped structure on the circumferential surface 124 of the container portion 104 may facilitate a user to comfortably hold the reusable bottle 100 when the reusable bottle 100 is completely frozen. Particularly, the plurality of ribs 122 at the waist portion 116 of the reusable bottle 100 may prevent contact of a larger surface area of skin of the user with the frozen content of the reusable bottle 100 as such the user can comfortably hold the reusable bottle 100 for a longer period. Further, the plurality of ribs 122 may increase structural rigidity of the reusable bottle 100 compared to a bottle without such corrugated structure, thereby avoid breakage of the reusable bottle 100 due to frozen content.

The plurality of ribs 122 may further act as a grip to enhance holding of the reusable bottle 100 by the user for a longer period as the reusable bottle 100 with frozen contents may be particularly subject to being wet due to condensation of water at the circumferential surface 124 of the reusable bottle 100.

Referring to FIG. 1 and FIG. 2, the body 102 of the reusable bottle 100 is made of a material having a polymer composition of about 85 to 90 percent of polypropylene (PP) and about 10 to 15 percent of an additive. The composition of the polypropylene (PP) with the additive improves flexibility of the reusable bottle 100 even at freezing temperature, which in turn makes the reusable bottle 100 flexible enough to take impact load without causing any cracks or damages to the body 102 of the reusable bottle 100. In one embodiment, the polymer composition incudes 85 percent of polypropylene (PP) and 15 percent of the additive. In some embodiments, the polymer composition incudes 90 percent of polypropylene (PP) and 10 percent of the additive. The percentage of additive in the polymer composition may be defined based on various factors including, but not limited, to the impact resistance required for the reusable bottle 100, type of liquid to be stored in the reusable bottle 100, and end use of the reusable bottle 100. Further, the additives in the polymer composition may make the body of the reusable bottle transparent. As such, the percentage of the additive in the polymer composition may be further defined based on the requirement of transparency level in the reusable bottle. In one embodiment, the polypropylene is polypropylene random copolymer (PPRC). In some embodiments, the polypropylene may be polypropylene block copolymer (PPB).

In one embodiment, the additive is a thermoplastic elastomer (TPE). In another embodiment, the additive is a styrene-based additive. In some embodiments, the additive is styrene-ethylene-butylene-styrene (SEBS). In some embodiments, the additive may be a material commercially known as NC™ UltraClear™ MaxImpact™ 10238, NX® UltraClear™, Ultraclear™, DeltaMax™ i300, DeltaMax™ a200, DeltaMax™ m100, or a combination thereof. The additives help to increase the impact resistance of the reusable bottle 100 and thereby make the reusable bottle 100 durable. With the additive in the polymer composition, the reusable bottle 100 can be subjected to colder temperature repeatedly and still a longer life can be achieved.

The cap 120 of the reusable bottle 100 is made of a material having a polymer composition of about 85 to 90 percent of polypropylene (PP) and about 10 to 15 percent of an additive. In one embodiment, the polymer composition incudes 85 percent of the polypropylene (PP) and 15 percent of the additive. In some embodiments, the polypropylene is polypropylene block copolymer (PPB), and the additive is styrene-ethylene-butylene-styrene (SEBS).

Figure 3:
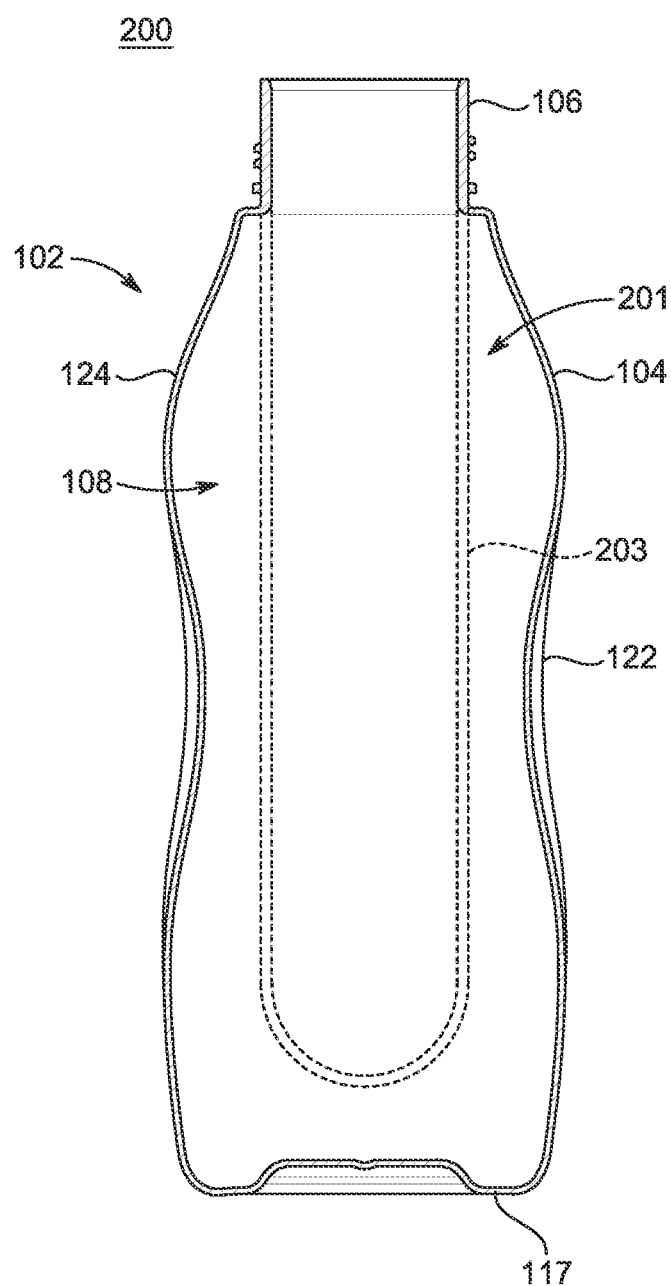
FIG. 3 is a schematic sectional view illustrating a method of making the reusable bottle of FIG. 1.
Figure 4:
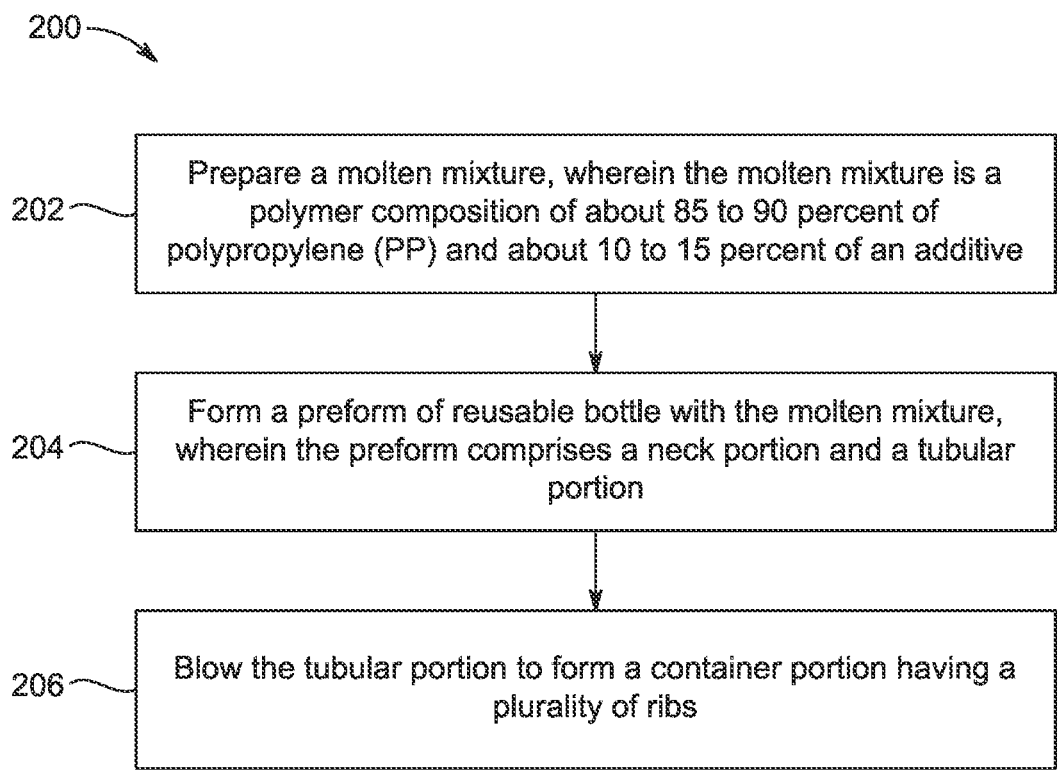
FIG. 4 is a schematic flow diagram of the method of making the reusable bottle of FIG. 3.

Referring to FIG. 3, a schematic sectional view illustrating a method 200 of making the reusable bottle 100 of FIG. 1 is illustrated, according to an embodiment of the present disclosure. Referring to FIG. 4, a schematic flow diagram of the method 200 of making the reusable bottle 100 is illustrated, according to an embodiment of the present disclosure. The method 200 of making the reusable bottle 100 may be described in the general context of injection molding process and blow molding process. The order in which the method 200 is described is not intended to be construed as a limitation, and any number of the described method steps can be combined in any order to manufacture the reusable bottle 100. Additionally, individual steps may be deleted from the method 200 without departing from the scope of the present disclosure.

Referring to FIG. 3 and FIG. 4, at step 202, the method 200 includes preparing a molten mixture. The molten mixture is the polymer composition of about 85 to 90 percent of the polypropylene (PP) and about 10 to 15 percent of the additive. In one embodiment, the polymer composition incudes 85 percent of the polypropylene (PP) and 15 percent of the additive. In some embodiments, the polypropylene is polypropylene random copolymer (PPRC), and the additive is styrene-ethylene-butylene-styrene (SEBS). In an embodiment, the molten mixture may be maintained at a melt flow index value of 25 or greater for the desired dispersal of the additive.

At step 204, the method 200 includes forming a preform 201 of the reusable bottle 100 with the molten mixture. The preform 201 of the reusable bottle 100 may be manufactured using an injection molding process. The injection molding process may use an injection mold having an interior volume defined corresponding to the shape of the preform 201. The molten mixture is then injected into the injection mold and subjected to cooling process to obtain the preform 201 of desired shape. The preform 201 includes the neck portion 106 and a tubular portion 203 extending from the neck portion 106.

At step 206, the method 200 includes blowing the tubular portion 203 to form the container portion 104 having the plurality of ribs 122. The preform 201 obtained through the injection molding process is further subjected to blow molding process to obtain the reusable bottle 100 of the present disclosure. The blow molding process may use a blow mold having an interior volume defined corresponding to the shape of the container portion 104. The preform 201 is then placed inside the blow mold and subjected to heat and air pressure of desired amount to obtain the reusable bottle 100 of the present disclosure. In an embodiment, a wall thickness of the container portion 104 of the reusable bottle 100 may be achieved in a range of about 1.0 mm to 1.5 mm. The peripheral corrugated structure corresponding to the plurality of ribs 122 of the container portion 104 may also be defined in the interior volume of the blow mold to define the plurality of ribs 122 on the container portion 104. In some embodiments, the fill level indicator 118 may be embossed or debossed on the container portion 104 during the blow molding process. In some embodiments, the fill level indicator 118 may be printed on the container portion after the blow molding process.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:
1. A freezable reusable bottle comprising:
a body comprising a container portion and a neck portion extending from the container portion, wherein the container portion comprises a plurality of ribs having a length extending along a longitudinal axis of the reusable bottle; and
a cap engaged with the neck portion of the body, wherein the body comprises a polymer composition of about 85 to 90 percent of polypropylene (PP) and about 10 to 15 percent of styrene-ethylene-butylene-styrene (SEBS);

wherein the plurality of ribs comprises a wave shaped structure of alternating longitudinal troughs and longitudinal crests around a circumferential surface of the container portion, wherein at least a portion of the plurality of ribs have longitudinal troughs and longitudinal crests of equal length that extend from a bottom of the bottle through a base portion through a waist portion to a top portion of the container portion;

wherein the top portion and the bottom portion converge at the waist portion and the waist portion has a first cross-sectional area that is smaller than a respective cross-sectional area of each of the top portion and the bottom portion, thereby each longitudinal trough and longitudinal crest has a wave shape along the length thereof having a first crest at the top portion, a trough at the waist portion, and a second crest at the base portion; and wherein each longitudinal crest protrudes outward and has a first width at the waist portion that is smaller than a second width at the top portion, thereby defining a grip portion for a user at the waist portion having a decreased contact surface area;

wherein a linear distance between immediately neighboring longitudinal crests progressively decreases from the waist portion toward both the top portion and the base portion of the container portion.

2. The reusable bottle of claim 1, wherein the polypropylene is polypropylene random copolymer (PPRC).

3. The reusable bottle of claim 2, wherein the polymer composition comprises 85 percent of the polypropylene random copolymer (PPRC) and 15 percent of the styrene-ethylene-butylene-styrene (SEBS).

4. The reusable bottle of claim 1, wherein the cap comprises a polymer composition of about 85 to 90 percent of polypropylene (PP) and about 10 to 15 percent of styrene-ethylene-butylene-styrene (SEBS).

5. The reusable bottle of claim 4, wherein the polypropylene is polypropylene block copolymer (PPB).

6. The reusable bottle of claim 1 further comprising a fill level indicator defined in the container portion proximate to the neck portion of the body.

7. The reusable bottle of claim 1, wherein the plurality of ribs is equally spaced around a circumferential surface of the container portion of the body.

8. A method of using a freezable reusable bottle comprising:

providing a reusable bottle according to claim 1;

filling said container portion with a beverage; and subjecting said body and cap to freezing temperatures until said beverage is frozen.

9. The reusable bottle of claim 1, wherein the body consists essentially of 85% to 90% PP and 10% to 15% SEBS.

10. The reusable bottle of claim 1, wherein the container portion has a generally peanut or hourglass shape.

11. The reusable bottle of claim 1, wherein the cap is threadingly connectable to the neck portion.

12. A freezable reusable bottle comprising:

a body comprising a container portion and a neck portion extending from the container portion, wherein the container portion comprises a top portion, a waist portion, and a base portion, and comprises a plurality of ribs extending in a direction linearly aligned with a central longitudinal axis of the reusable bottle; and a cap engaged with the neck portion of the body, wherein the body comprises a polymer composition consisting essentially of 85 to 90 percent of is polypropylene random copolymer (PPRC) or polypropylene block copolymer (PPB) and 10 to 15 percent of styrene-ethylene-butylene-styrene (SEBS);

wherein the plurality of ribs, in a transverse cross-section through the waist portion, have a corrugated structure defining at least a portion of the exterior circumferential surface of the bottle, and, in a direction parallel to the central longitudinal axis of the bottle, the entire corrugated structure has a wave form having a trough at the waist portion;

wherein a linear distance between immediately neighboring crests progressively decreases from the waist portion toward both the top portion and toward the base portion of the container portion.

13. The reusable bottle of claim 12, wherein the polymer composition consists essentially of 85 percent of the polypropylene random copolymer (PPRC) and 15 percent of the styrene-ethylene-butylene-styrene (SEBS).

14. The reusable bottle of claim 1, wherein, in a transverse cross-section, the top portion and the waist portion each have a circular shape and the base portion includes a planar surface or an inclined surface.

* * * * *